No. 895,574. PATENTED AUG. 11, 1908.
J. R. MOORE.
SLOW FEEDING DEVICE FOR ANIMALS.
APPLICATION FILED FEB. 11, 1908.

2 SHEETS—SHEET 1.

Witnesses

Inventor
Jesse R. Moore.

By E. H. Bond
Attorney

No. 895,574. PATENTED AUG. 11, 1908.
J. R. MOORE.
SLOW FEEDING DEVICE FOR ANIMALS.
APPLICATION FILED FEB. 11, 1908.
2 SHEETS—SHEET 2.
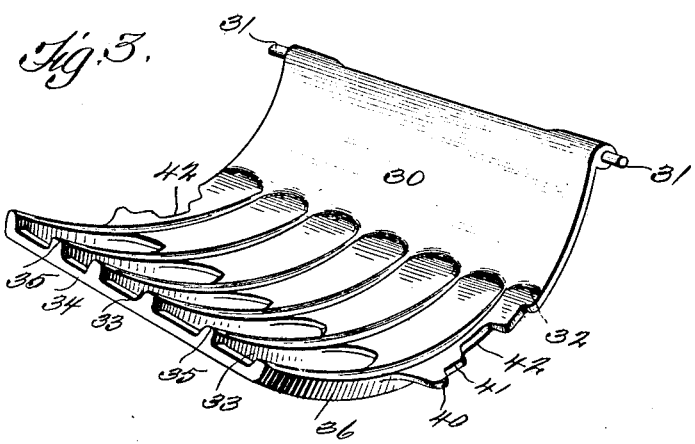
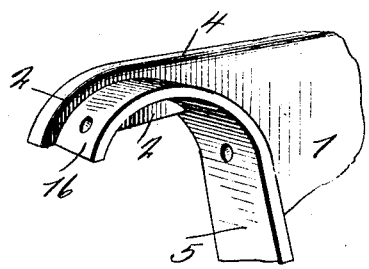
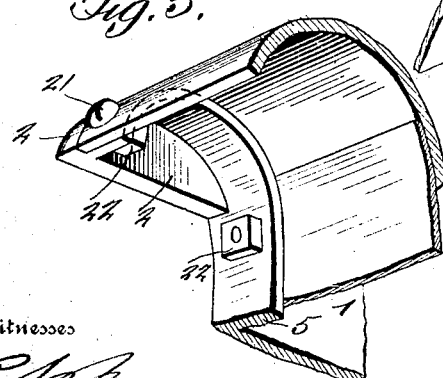
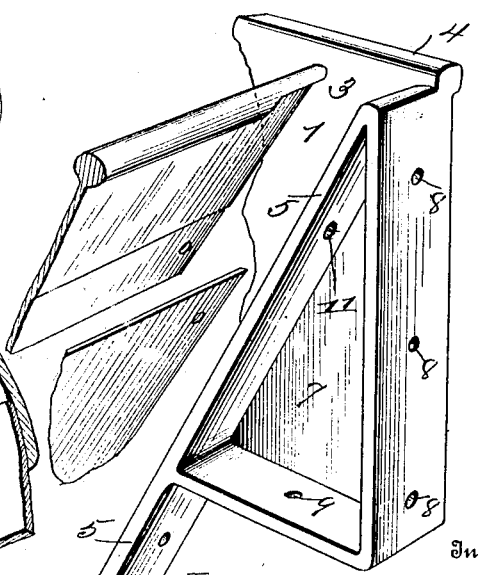
Inventor
Jesse R. Moore.
By E. W. Bond
Attorney
Witnesses
R. A. Boswell
M. A. Bond

UNITED STATES PATENT OFFICE.

JESSE R. MOORE, OF TOPEKA, KANSAS.

SLOW-FEEDING DEVICE FOR ANIMALS.

No. 895,574.         Specification of Letters Patent.         Patented Aug. 11, 1908.

Application filed February 11, 1908. Serial No. 415,331.

*To all whom it may concern:*

Be it known that I, JESSE R. MOORE, a citizen of the United States of America, and resident of Topeka, in the county of Shawnee and State of Kansas, have invented certain new and useful Improvements in Slow-Feeding Devices for Animals, of which the following is a specification.

This invention relates to certain new and useful improvements in slow feeding devices for animals, designed primarily for use in stables for feeding horses, having for its objects among others to provide a simple and cheap yet efficient and practically indestructible slow feeding feed box or trough having no complicated parts to get out of order, easily cleaned and hence sanitary, and so constructed that mashes can be fed with it as easily as in the old style feed box. Provision is made for preventing the access of the animal to the feed except in proper quantities, a perforated or rack member being suspended above the bottom of the box and resting upon the feed, and gravitating means being provided to limit the upward movement of this member so that the animal cannot possibly get his nose under the free end of said member to lift the same and get full access to the feed. The feed box is strong, has an attractive appearance and is well adapted to the uses to which it is to be put.

Other objects and advantages of the invention will hereinafter appear and the novel features thereof will be particularly pointed out in the appended claims.

Figure 1:
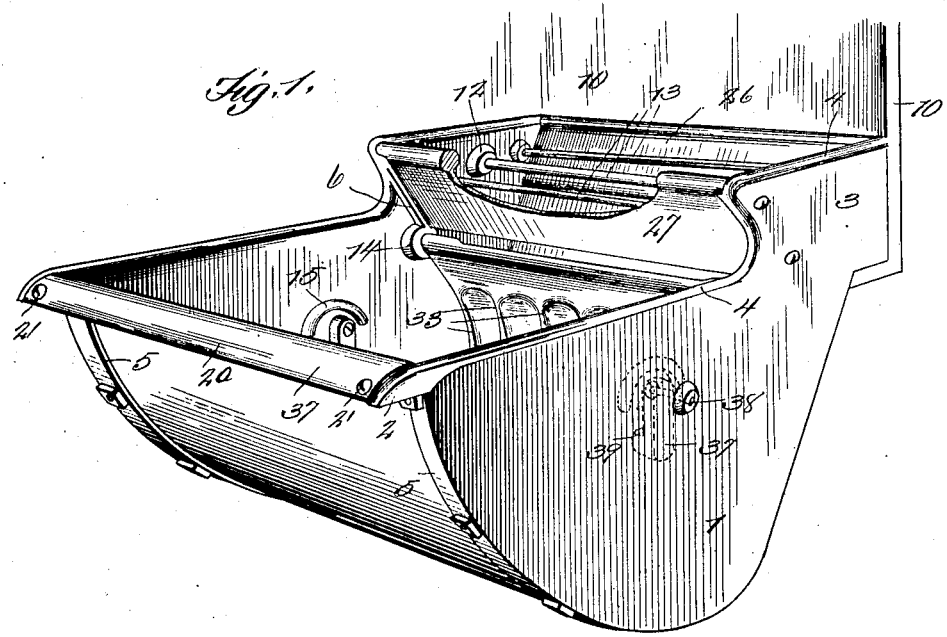
Figure 2:
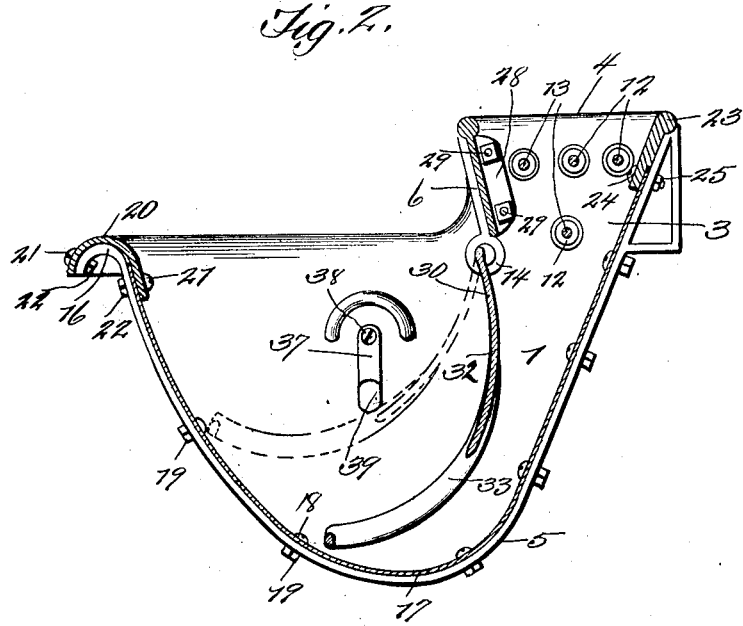

The invention is clearly illustrated in the accompanying drawings which, with the numerals of reference marked thereon, form a part of this specification and in which Figure 1 is a perspective view of the improved feed box in position for use. Fig. 2 is a substantially central vertical section through the box from front to rear. Fig. 3 is a perspective view of the rack member removed. Fig. 4 is a perspective detail showing a portion of the front end of one side of the box. Fig. 5 is a sectional perspective detail of a portion of the front end of the box. Fig. 6 is a perspective detail of the rear of one end of the box.

Like numerals of reference indicate like parts throughout the several views.

Referring to the drawings 1 designates one end of the box, and as both ends are similarly constructed a detailed description of one will suffice for both. This end is formed of the shape shown in Fig. 1 having at the front the extension 2 and at the rear the upward and rearward extension 3. This end portion is formed at its upper edge with a rounded or rolled strengthening bead or flange 4 which adds also to the finished appearance of the box, as seen clearly in Figs. 1 and 6. This end is formed further with an inwardly extending flange 5 serving as a support and securing means for the bottom of the box, and interiorly at the junction of the rearward extension 3 with the main portion of the end it is formed with the inwardly extending flange 6 to be engaged by the upper front portion of the hopper part of the box.

At the rear each end is formed with the triangular extension 7, as seen most clearly in Fig. 6, the vertical and horizontal portions of which are provided with openings 8 and 9 respectively for the reception of screws or bolts or other means by which it may be affixed in position to a vertical wall or other support 10, as seen in Fig. 1. As seen in Fig. 6, the inwardly extending flange 5 is extended to the top at the rear forming one side of the said triangular extension, being provided within the triangle with an opening 11 to receive means which holds the bottom in place. The rear vertical portion of the end is provided with one or more sockets 12 to receive a transverse rod or rods 13, as seen in Fig. 1, to afford sufficient transverse bracing of the ends at this point if necessary. The end portions are also formed at the base of the inwardly extending flange 6 with sockets 14, which sockets are adapted to receive the pintles of the swinging rack member, as seen in Figs. 1 and 2. Each end portion is also formed upon its inner face with an arc-shaped rib 15, the object of which will soon be made apparent. The forward extension 2, as seen best in Figs. 4 and 5, has the inwardly extending curved flanged portion 16 which is a continuation of the flange 5, which gives symmetry to the front end of the box.

17 is the bottom of the box. It conforms to the flanges 5 and 16 and is secured thereto by suitable means as bolts and nuts 18 and 19, as shown. At the front edge of the box, the front edge of the bottom is covered and protected by the curved protector plate 20 which is secured to the flange 5 and the curved flange 16 by suitable bolts 21 and nuts 22 or other convenient means. At the rear there is provided a reinforcing plate 23, the lower edge of which overlaps the upper edge of the bottom, as seen clearly in Fig. 2, this reinforcing plate being secured to the flange 5 and to the upper edge of the bottom by suitable means as the bolts 24 and nuts 25 some of which latter pass through the openings 11 within the triangular extension at the upper rear corners of the box.

The front of the hopper or feed receptacle 26 is formed by a plate 27, the front edge of which bears against the flanges 6, the said plate having lugs or flanges 28 upon the rear face at the ends which are secured to the end portions 1 by suitable means 29, as seen best in Fig. 2. The upper faces of the plates 23 and 28 are rolled or rounded, as seen clearly in Fig. 2, thus providing strength and a finished appearance at these points.

30 is the rack member having suitable pintles 31 at the ends which are received within the sockets 14, as shown, and this member is provided with an upper solid portion 32 which serves as a valve or guard to prevent the too rapid flow of the material from the hopper into the lower portion of the box, this lower or front portion being slatted or provided with openings 33 through which access is had by the animal to the feed. This slatted or rack member may be formed in any suitable manner. In Fig. 3 it is shown as provided with the transverse connecting bar 34 and the parallel members 35 at right angles thereto upon opposite sides of the opening 33, thus providing the raised portions which may be of any desired height and which serve to prevent too close contact of the mouth of the animal with the feed beneath the slatted member. This member is mounted for free movement, its lower portion being curved, as seen at 36, the curvature thereof being practically although not quite parallel with the curvature of the bottom of the box, the said rack member being so pivotally suspended as to normally swing toward the back of the box, in which position it is shown in full lines in Fig. 2. It is free to be pressed forward and upward by the feed which flows down to the rear thereof. It lies normally supported upon said feed and as the feed decreases the rack member automatically follows the feed and gravitates toward the back of the box.

In order to prevent the upward lifting of this rack member beyond a predetermined point, a gravitating stop 37 is provided, as seen in Figs. 1 and 2. This stop is freely pivoted, as at 38 to the inner face of the end of the box, there being preferably two of such stops, as seen in Fig. 1, although one will serve effectually. Each stop has at its lower end an inwardly extended lug 39, as seen best in Fig. 1. This stop is pivoted beneath the lug 15 and is limited in its upward movement in both directions by engagement with the ends of said lug, as will be readily understood. As the rack is moved upward it contacts with the lug or lugs 39 or with the lower ends of the stops and as the latter come in contact with the under side of the forward ends of the lugs they are prevented from further movement and thus the rack can move no further. For this purpose, the sides of the rack member are provided with the lugs 40 and 41 which engage the said lugs 39 on the stops, and in order to provide for the throwing up of the rack member when desired, for the purpose of cleaning, the side portions of the rack member are provided with the openings 42 which allow the stops 37 to be received therein and thus permit of the upturning of the rack member. This action, however, can take place only when the stops have been moved to a position to the rear of the vertical line through the stops, it being understood that normally, and in the use of the box the stops gravitate toward the front of the box to such position that it is impossible to raise the rack member beyond the predetermined position.

The box may be made of any desired capacity and of any suitable material, pressed steel being preferred.

From the above description when taken in connection with the annexed drawings, the mode of use will be clearly apparent and a further detailed description thereof does not seem necessary.

Modifications in detail may be resorted to without departing from the spirit of the invention or sacrificing any of its advantages.

What is claimed as new is:—

1. A slow feeding feed box having a rounded bottom and provided with a pendulous curved member adapted to rest upon the feed and having openings for the passage of the feed therethrough and means for limiting the upward forward movement of said member.

2. A slow feeding feed box having a rounded bottom and provided with a pendulous curved member adapted to rest upon the feed and having openings for the passage of the feed therethrough, the portions between said openings being raised and means for limiting the upward forward movement of said member.

3. A slow feeding feed box provided with a gravitating member having openings for the passage of the feed, and gravitating means limiting the forward and upward movement of said member.

4. A slow feeding feed box provided with a gravitating member having openings for the passage of the feed, and gravitating means limiting the forward movement of said member, said member having an opening in its side for the passage of the gravitating means to permit said member to be thrown forward.

5. A slow feeding feed box having a pendulous member with openings for the passage of the feed and a lug upon its side, and a gravitating stop for coöperation therewith.

6. A slow feeding feed box having a pendulous member with openings for the passage of the feed and a lug upon its side, and a gravitating stop for coöperation therewith, said stop having an inwardly extended lug.

7. In a slow feeding feed box, a pendulous member having openings for the passage of the feed, a gravitating member coöperating therewith, and a lug on the inner face of the end of the box coöperating with said gravitating member.

8. In a slow feeding feed box, a pendulous member having openings for the passage of the feed, a gravitating member coöperating therewith, and a lug on the inner face of the end of the box coöperating with said gravitating member, said gravitating member having an inwardly extending lug.

9. In a slow feeding feed box having a rounded bottom, a pendulous curved member having openings at its lower end, and an imperforate upper portion serving as a valve and means for limiting the upward forward movement of said member.

10. In a slow feeding feed box having a rounded bottom, a pendulous curved member having openings at its lower end, an imperforate upper portion, and pintles extending laterally from the upper portion combined with a box having sockets to receive said pintles, and means on the inner side of said box to engage said member to limit its upward movement.

11. In a slow feeding feed box, ends having inwardly-extending flanges, a bottom supported thereon, a curved reinforcing strip at the front covering the front end of said bottom, and a gravitating member freely mounted between said ends and having a slatted portion and resting upon and secured to said flanges.

12. In a slow feeding feed box, ends having inwardly extending flanges, a bottom supported on and secured to said flanges, and a reinforcing strip at the rear overlapping the upper edge of the bottom and secured to the rear end of said bottom and to the ends, and a gravitating member freely mounted between said ends and having a slatted portion.

13. In a slow feeding feed box, ends having inwardly extending flanges, a bottom supported on and secured to said flanges, a reinforcing strip at the rear secured to the rear end of said bottom and to the ends, and a curved reinforcing strip resting upon and secured to said flanges at the front of the box, and a gravitating member freely mounted between said ends and having a slatted portion.

14. In a slow feeding feed box, an end having an inwardly extending flange, and a forwardly extending portion at its upper end, said flange extending throughout said portion and a triangular flanged member at the rear.

15. In a slow feeding feed box, an end portion having a forward extension at its upper edge and an inwardly extending flange, said flange being curved at its upper forward end and continuous of said forward extension.

16. In a slow feeding feed box, end portions each having a forward extension at its upper edge, an inwardly extending flange, said flange being curved at its upper forward end and continuous of said forward extension, a bottom secured to said flanges and a curved reinforcing plate secured to said bottom and curved portions of the flanges.

17. A slow feeding feed box comprising ends with inwardly extending flanges, a bottom supported on and secured to said flanges, a reinforcing plate at the front, a reinforcing plate at the back and a plate secured to said ends and with said ends and back plate forming a hopper.

18. A slow feeding feed box comprising ends with inwardly extending flanges, a bottom supported on and secured to said flanges, a reinforcing plate at the front, a reinforcing plate at the back and a plate secured to said ends and, with said ends and back plate forming a hopper, said ends having inwardly extending flanges engaging the front wall of the hopper.

19. A slow feeding feed box comprising ends with inwardly extending flanges, a bottom supported on and secured to said flanges, a reinforcing plate at the front, a reinforcing plate at the back, a plate secured to said ends and, with said ends and back plate forming a hopper, and a pendulous member pivotally mounted beneath the front wall of the hopper, and a gravitating member coöperating with said pendulous member.

20. A slow feeding feed box comprising ends with inwardly extending flanges, a bottom supported on and secured to said flanges, a reinforcing plate at the front, a reinforcing plate at the back, a plate secured to said ends and, with said ends and back plate forming a hopper, a pendulous member pivotally mounted beneath the front wall of the hopper near the bottom of said front plate, and a gravitating member for coöperation with said pendulous member to prevent its upward movement beyond a predetermined point.

Signed by me at Topeka, Kansas, this 8th day of February 1908.

JESSE R. MOORE.

Witnesses:
J. B. LARIMER,
OLLIE McNOWN.